(12) United States Patent
Vorobiev

(10) Patent No.: US 8,647,514 B2
(45) Date of Patent: Feb. 11, 2014

(54) METHOD FOR REMOVING IMPURITIES FROM WATER AND A DEVICE FOR CARRYING OUT SAID METHOD

(76) Inventor: Leonid Jurievich Vorobiev, Novosibirsk (RU)

( * ) Notice: Subject to any disclaimer, the term of this patent is extended or adjusted under 35 U.S.C. 154(b) by 729 days.

(21) Appl. No.: 12/988,642

(22) PCT Filed: Apr. 21, 2008

(86) PCT No.: PCT/RU2008/000241
§ 371 (c)(1),
(2), (4) Date: Oct. 20, 2010

(87) PCT Pub. No.: WO2009/131480
PCT Pub. Date: Oct. 29, 2009

(65) Prior Publication Data
US 2011/0031189 A1  Feb. 10, 2011

(51) Int. Cl.
C02F 1/74 (2006.01)
C02F 1/38 (2006.01)

(52) U.S. Cl.
USPC ...... 210/758; 210/220; 210/748.01; 210/153; 210/221.1; 210/221.2; 422/20; 422/243; 422/127; 422/128; 366/101; 366/107

(58) Field of Classification Search
USPC .............. 210/109, 194, 195.1, 197, 199, 202, 210/206, 220, 221.2, 512.1, 512.2, 525, 210/528, 532.1, 703, 707, 758, 787, 789, 210/748.01–748.2; 422/20, 127, 128, 243; 366/101–107; 417/171, 194
See application file for complete search history.

(56) References Cited

U.S. PATENT DOCUMENTS

| 3,306,449 A * | 2/1967 | minegishi Toyomasa .... 210/123 |
| 3,788,476 A * | 1/1974 | Othmer ......................... 210/194 |
| 2005/0284819 A1* | 12/2005 | Leffler .......................... 210/703 |

* cited by examiner

*Primary Examiner* — Joseph Drodge
*Assistant Examiner* — Cameron J Allen
(74) *Attorney, Agent, or Firm* — Bardmesser Law Group

(57) ABSTRACT

A standing wave in a water current, which is subject to purification, is swirled in the lower mass-exchange chamber in order to create negative pressure along the central axis, the atmosphere air intake and crating of two countercurrents interacting with each other, resulting in a standing wave and oxygenation of the water current. A cylindrical mixing chamber, which is divided into the upper mass-exchange chamber and the lower mass-exchange chamber by dividing walls with a coaxial orifice towards the air-supply pipe and peripheral bypass channel. In the lower mass-exchange chamber, water, which is subject to purification, is swirled and under the negative pressure in the center it intakes air from the air-supply pipe, creating hydrosol and reaction area of ion exchange due to forming of the standing acoustic wave. Part of the processed current is outlet into the volume through a permeable wall in the side surface of the upper mass-exchange chamber. In the volume there is at least one cylindrical mixing chamber. In the lower part of the volume there are branch pipes for outputting undissolved impurities and clean water. In the upper part of the volume there is a branch pipe for outputting spent air.

7 Claims, 2 Drawing Sheets

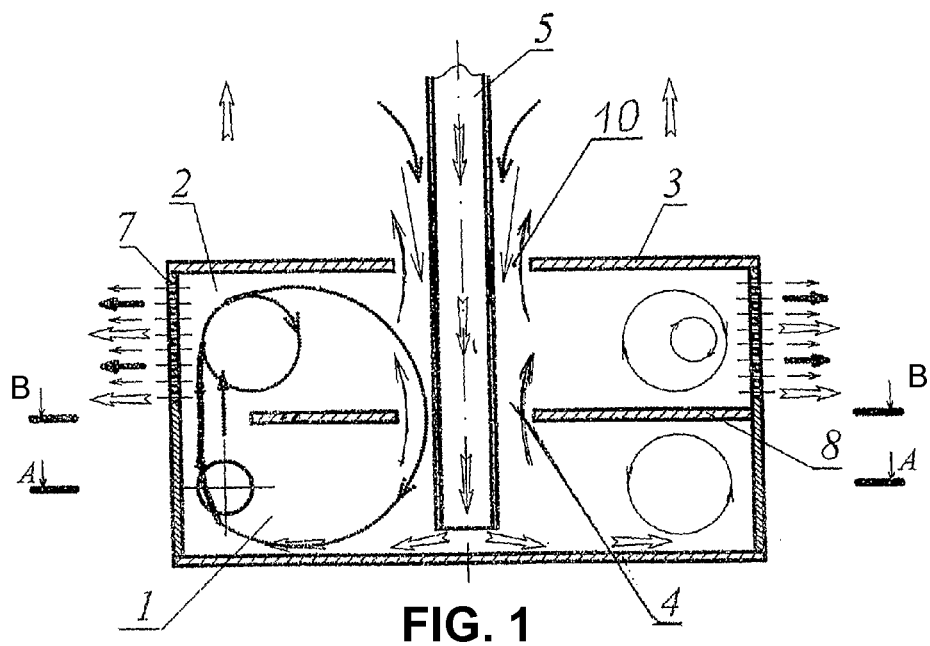
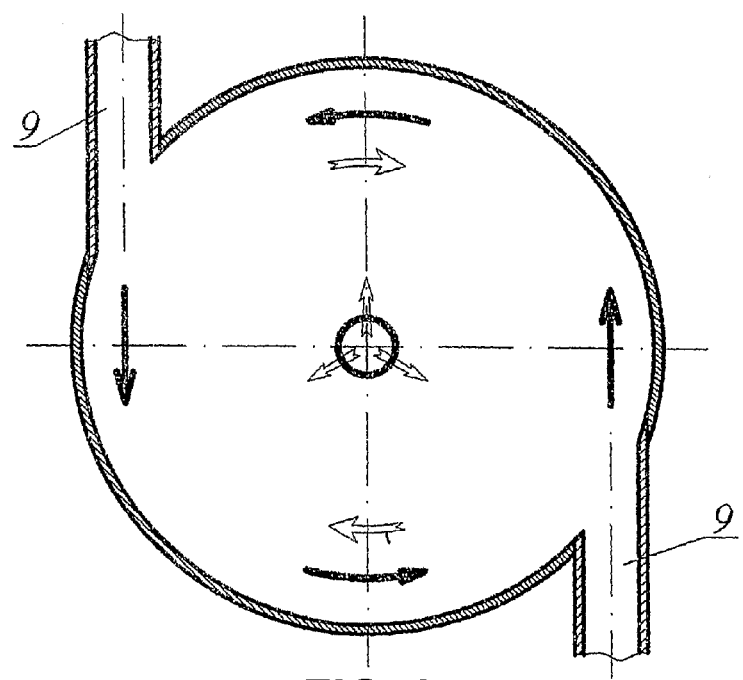
FIG. 1
FIG. 2

B-B

METHOD FOR REMOVING IMPURITIES FROM WATER AND A DEVICE FOR CARRYING OUT SAID METHOD

CROSS-REFERENCE TO RELATED APPLICATIONS

This application is a U.S. National Phase of PCT/RU2008/000241, which is incorporated herein by reference in its entirety.

FIELD OF THE INVENTION

Field of the invention is purification of natural waters, different waste waters and can be applied for final post-treatment and decontamination of town water.

DESCRIPTION OF THE RELATED ART

An aerator is known in the art as (see patent RU 2021979). The aerator is provided with a special water intake in the shape of cover that is coaxial with a unishaft in the form of a backward-flattened cone, with tangential water intake swirl orifices mounted on its upper larger base. The rotor of the aerator is equipped with bow-shaped blades, as well as with pinned blades, and has a free cyclic rotor for generating hydraulic shock and crushing of air bubbles in an intense cavitation mode. When the aerator works, inside the cover there is created a stable funnel of air along the axis of the air current, and higher layers water flow swirling on the surface, which provides enhancement of the level of water aeration, an increase in efficiency and durability of the aerator.

A disadvantageous feature of the device is an insufficiently high degree of water oxygenation. The aerator does not allow to perform reagentless purification of water and different kinds of waste waters.

There are known the method and device for cavitational purification of water (See WO 2005082786). The water, which is subject to purification, goes through the train equipped with a device for narrowing of the current. In the process of flowing of water through such device, there occurs a water speed increase and a pressure decrease, which leads to cavitation maintained in a slave operation. The cavitational process results in degradation of impurities in the water and in formation of less detrimental compounds. The water purification is performed without radiation processing or using of additional sources of energy.

A disadvantageous feature of the method and device is in the fact that cavitation is difficult to maintain in slave operation and consequently, the required level of water purification can not be achieved.

There is known a method of water processing by using air which can be applied during decontamination of drinking or domestic water as well as of waste waters purification. This method of water processing includes its aeration by means of air injection with water and its cavitation. In order to achieve water cavitation, the current is sputtered from an injection valve under different pressure not less than 2 atmospheres, and for aeration of water, the ejected air is fed into the sputtered water after its cavitation. After that, the water is separated from gaseous and solid impurities. Engineering result: effective purification and decontamination of water without applying of chemical agents (see Patent RU 2272791).

A disadvantageous feature of the method is complexity in technical maintenance of the installation for purification of water and waste waters.

In order to increase effectiveness of the cavitational processing of liquid current a method of liquid fluid processing in a cavitational reactor is described (Patent RU 2254913), in which the liquid fluid current with specified speed is brought through the cavitational reactor, with a standing acoustic wave generating cavitation. On one of the flat surfaces parallel to vibrational displacement of liquid particles in the acoustic wave, the current is bounded by a thin-plate orifice. Inside the cross-section bounding the current, density of time-average potential energy of cavitation is set at not less than its average value in terms of reactor volume, in the absence of the thin-plate orifice.

A disadvantageous feature of the method is insufficient level of water purification.

In order to scale up the level of water purification without use of chemical agents, it is suggested to use a swirl flow by means of different installations.

There is known a method of water cleaning from iron and a device for its implementation. The method includes supplying purified water into the cleaning device, organization of swirl water current, input of last atmospheric air along the axis, providing water oxygenation, and separate outputs of purified water and undissolvable impurities from the device. Oxygenated swirl current is fed tangentially into a drum and swirled about an axis that is orthogonal to the axis of the fed swirl current, and undissolved impurities formed in the current and concentrated peripherally are output into a trapping site, and the main current is additionally brought through a filtering element before final output from the device (See Published Application RU 96108537).

The device for embodiment of this method comprises a cylindrical chamber for mixing the purified water with air, an air supply pipe incoming into the mechanical center of the chamber end, a trapping site for collection of undissolved impurities, and separated outputs for purified water and undissolved impurities from the device. It is equipped with a cylindrical chamber, in the middle part of which there is a filtering element forming in the bottom part a collector for clean water with output from the device. In the mechanical center of the upper end of the chamber, there is installed a valve for outlet of spent air. Through it, the two volumes are joined with the chamber by a branch pipe, one end of which is joined with the mechanical center of the chamber end, opposite to the end with the air pipe, while another end of the branch pipe is tangentially input into the upper part of the volume through its side free of the filtering element. The trapping site is joined with the upper part of the volume by a branch pipe with a stop valve a through its flank side.

A disadvantageous feature of the above-described devices is the fact that the speed swirl current falls very quickly, which results in lack of time for transformation of impurities of the water current into insoluble residue. It is necessary to apply additional filtering elements, which makes the process of the current purification more complex.

There is known a device for water cleaning from iron comprising a cylindrical chamber for organizing of a swirl current, a trapping site for collection of undissolved impurities, separated outputs for purified water and undissolved impurities. In the inlet part of the chamber there is settled a branch pipe for in-feeding of purified water passing through a whirler into the chamber, the trapping site is formed as two sections. The first section is formed in the form of a ring-type cylindrical volume overlapping the cylindrical chamber and interconnecting with it by means of at least one set of axially symmetric orifices placed on perimeter of the cylindrical chamber in the flat surface perpendicular to the turning axis of the current. The second section is formed as a cylinder, the upper end of which is the bottom of the cylindrical chamber with ox symmetrical orifices to diameter coaxial to the turning axis of the current. Outputs for undissolved impurities are placed in the lower part of both sections of the trapping site, and the surface area of the axially symmetrical orifices in the second section of the trapping site is not more than 20% of the surface area of the cross-section of the output for purified water. The diameter on which axially symmetrical orifices of the second section of the trapping site are placed is more than the diameter of the opposite solid end of the cylindrical chamber (Application RU 2006118625).

This device had the same disadvantageous features like the above-described device.

As it is seen from the above-described, at present, there is a need for reagentless high-level purification of water, allowing to purify waste waters and decontaminate drinking water, perform final purification and decontamination of faucet water, and for processing of natural water.

SUMMARY OF THE INVENTION

The object of the invention is an effective method of impurities removal from water solutions without using of chemical reagents, with a high pre-set level of purification of water, with a simultaneous decrease of duration of the purification process, and development of a device for embodiment of the method.

The problem is solved by means of the method of water cleaning from impurities, which includes an input for purified water in a cylindrical mixing chamber, a swirling water current, an input along the axis of the air mixing chamber for providing water oxygenation, and output from the cylindrical mixing chamber for water and undissolved impurities. In the cylindrical mixing chamber there is created a standing wave, for creating of which the cylindrical mixing chamber is divided into an upper mass exchange chamber and a lower mass exchange chamber, through a division wall with coaxial orifice located towards the air-supply pipe, and with peripheral by-pass channels for air supply and water cross flow. The water current, which is subject to purification, is swirled in the lower mass-exchange chamber at a preset peripheral speed for creating negative pressure along the central axis of the cylindrical mixing chamber, the inlet of atmosphere air so as to form two countercurrents in the lower and upper mass-exchange chambers, which communicate with each other. The standing wave is formed simultaneous with oxygenation of the water current. The insoluble fine-divided impurities formed in the water current, concentrated peripherally in the swirl current in the cylindrical mixing chamber, are output from the cylindrical mixing chamber through a permeable wall in the side surface of the upper mass-exchange chamber in the larger volume.

The task is also solved by a water treatment device, comprising a cylindrical chamber for mixing the current of purified water with air, an air supply pipe, directed into the center of the chamber end, a volume for collecting undissolved impurities, and separated outputs for purified water and undissolved impurities from the water treatment device. The cylindrical mixing chamber is covered on top with a cover plate, through the center of which there is installed the air-supply pipe.

The cylindrical mixing chamber is divided into the upper mass-exchange chamber and the lower mass-exchange chamber by division walls with coaxial orifices towards the air-supply pipe and with peripheral bypass channels. The lower mass exchange chamber is formed in the lower part by the end of the cylindrical mixing chamber, and is equipped with at least two tangential branch pipes for inlet of purified water and for swirling the water current. In the division wall, there are peripheral bypass channels for inlet of clouds and solid inclusions into the upper mass-exchange chamber. On the side surface of the upper mass-exchange chamber, there is a permeable wall for outlet of the processed water current into the volume of larger volume, in which there is settled at least one cylindrical mixer. In the lower part of the volume there is a branch pipe for outlet of insoluble substances, and a branch pipe for cleaned water, and in the upper part of the volume there is installed a branch pipe for outlet of spent air.

The water treatment device preferably is provided with pumps for supply of purified water, a collector for purified water, a pipe line and automatic control.

In the device for water purification, as a permeable wall there is preferably used a net, or the permeable wall can be formed by making orifices of preset size on the side surface of the upper mass-exchange chamber.

Preferably, on the cover plate of the upper part of the cylindrical mixing chamber, there are coaxial orifices on the air-supply pipe side.

Preferably, in the volume there are installed at least two cylindrical mixing chambers.

The method is as follows: through the peripheral area of the cylindrical mixing chamber (the lower mass-exchange chamber), the purified water is pumped through the tangential branch pipes. The formed swirl current rounds through a cellular structure. There is negative pressure along the rotation axis of the current, which provides a flow of the air current, which, by spreading towards the water current at a preset speed, meets active ions, reacts with them having reached the periphery of the upper mass-exchange chamber with the main current take away from the reaction area, the impurities through the side of the upper mass-exchange chamber, in which there is installed a net with preset size of orifices.

Water is the best dissolvent for mineral salts. In the proposed method of organized swirl current with creating of standing wave, at high speed of mixing salts split and segregate into ions. Water creates positive ions of hydrogen and OH hydroxyl groups. In the water solution of sufficient mass, there is an ion exchange. Insoluble compounds sediment out water gets free from impurities dissolved in it and achieves equilibrium composition. The organization of ion exchange of dissolved salts and outlet of derived impurities of reaction out of the reaction area became possible during performance organization according to the set forth method of countercurrents controlled in accordance with needed quality of water purification.

The maximum speed of the chemical process with a solid phase occurs in case of maximum contact area of the phases. In this method, there are interacting swirl water countercurrents, and a high-speed ion exchange takes place.

As a result of the process intensification, according to the method, all reactions (oxidation reduction, displacement, neutralization, partial electrolysis of water and many others) proceed to completion. Subject to the existence of iron ions in purified water, directly in the device there is derived iron hydroxide (III) with molal degree of dispersion with further preparation of gel of preset structure and with needed properties, which allows co-deposition of many impurities.

By means of ion exchange, one can easily remove calcium, magnesium, manganese and others. Derived nucleating seeds of insoluble compounds are up to 5 Angstrom in diameter, which does not allow to process them in standard filters.

During their derivation, iron hydroxides are capable of inserting into their structure those nucleating seeds, for instance, ferric oxides pass into crystallohydrates and enlarge, forming soap flakes, which means that there takes place co-deposition by ferric hydroxide.

Purified water is accelerated to the preset speed, swirled and made to flow through the curvilinear trajectory along the permeable wall, behind which in the volume of a large size there is maintained a pressure equal to the static pressure behind the net. Due to the dynamic pressure of the current the soap flakes, together with water, pass through the permeable wall in the upper part of the cylindrical mixing chamber and stay in the volume of a large size, allowing water molecules to move back to the swirl current after having run into the wall, due to static pressure in the large volume. In the large volume there is collected, in the form of a "drench", a large mass of crystallohydrates, hydroxides and nucleating seeds of undissolved derived compounds, which is the primary means of cleaning water from nucleating seeds of insoluble impurities.

BRIEF DESCRIPTION OF THE DRAWINGS

FIG. 1 shows a cylindrical mixing chamber in which there is performed reforming of the liquid current;

FIG. 2 shows a sectional elevation of the cylindrical mixing chamber along the line A-A;

DETAILED DESCRIPTION OF THE PREFERRED EMBODIMENTS

Figure 3:
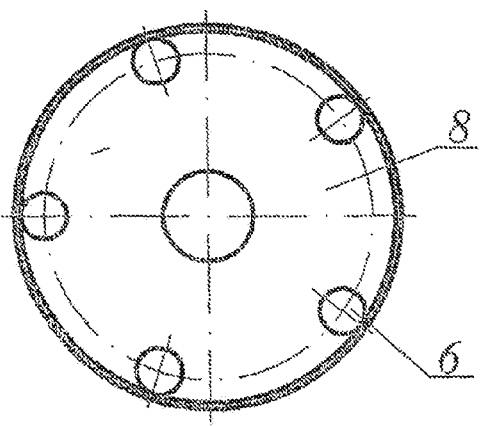
FIG. 3 shows a sectional elevation along the line B-B.

The cylindrical mixing chamber, in which transformation of multiphase fluid current takes place, includes two mass-exchange chambers: the lower one 1 and the upper one 2. The lower mass-exchange chamber 1 is formed in the lower part of the cylindrical mass-exchange. The upper mass-exchange chamber 2 is covered by a cover plate 3. The upper 2 and the lower 1 mass-exchange chambers communicate with each other through a coaxial orifice 4. In the center of the cover plate 3 there is installed an air supply pipe 5.

The mass-exchange chambers, the lower one 1 and the upper one 2, are joined by a bypass channel 6.

On the side surface of the upper mass-exchange chamber 2 of the cylindrical mixing chamber, there is installed a permeable wall, for instance, in the form of a net 7, for the outlet of processed fluid current in the volume of larger size, in which there is installed a cylindrical mixing chamber, or on the side surface of the upper mass-exchange chamber 2 of the cylindrical mixing chamber there are orifices of a preset size.

On the dividing wall 8 there is made a coaxial orifice 4 towards the air-supply pipe 5 and bypass channels 6.

The lower mass-exchange chamber 1 of the cylindrical mixing chamber is equipped with tangential branch pipes 9 for supplying purified water.

In the cover plate 3, there is a coaxial orifice 10 towards the air-supply pipe 5, in order to reduce hydraulic resistance of the cylindrical mixing chamber, according to the preferred embodiment.

According to another embodiment of the device, the coaxial orifice 10 in the cover plate 3 can be absent in the cylindrical mixing chamber.

In the volume 15, there is a cylindrical mixing chamber in which the upper mass-exchange chamber 2 is joined with the lower mass-exchange chamber 1 by the coaxial orifice 4 and bypass channel 6 and tangential branch pipes 9 for supplying purified water. In the lower part of the volume 15, there is a branch pipe 11 for outlet of formed insoluble impurities and a branch pipe 12 for outlet of purified water. In the upper part of the volume 15 there is installed a branch pipe 13 for outlet of spent air. The device is provided with a pump 14 for supply of original purified water.

The device functions in the following way: original purified water is fed by the pump 14 into the lower mass-exchange chamber 1 of the cylindrical mixing chamber, where it is swirled. Under negative pressure it aspirates air from the air-supply pipe 5, generating hydrosol and reaction area of ion exchange due to creation of a standing acoustic wave. The hydrosol is rotated at a preset speed. In the rotating hydrosol, current processes of ion exchange proceed.

Large-size formations (coagulates) following the rotating current by force of inertia accumulate themselves along the peripheral part of the mass-exchange chambers, communicate through bypass channels 6, and are collected in the upper mass-exchange chamber 2 of the cylindrical mixing chamber. They push each other out through the coaxial orifice 4. Through the free surface of the volume 15, spent air flows out through a branch pipe 13. Formed soapflakes of insoluble impurities are periodically output from the volume 15 through the branch pipe 11 and are disposed. Water with a needed level of purification is fed through the branch pipe 12 to consumers.

The Preferred Embodiment

The proposed device can be easily reset for high volume by means of installation of larger number of cylindrical mixing chambers and by increasing the speed of the current.

Figure 4:
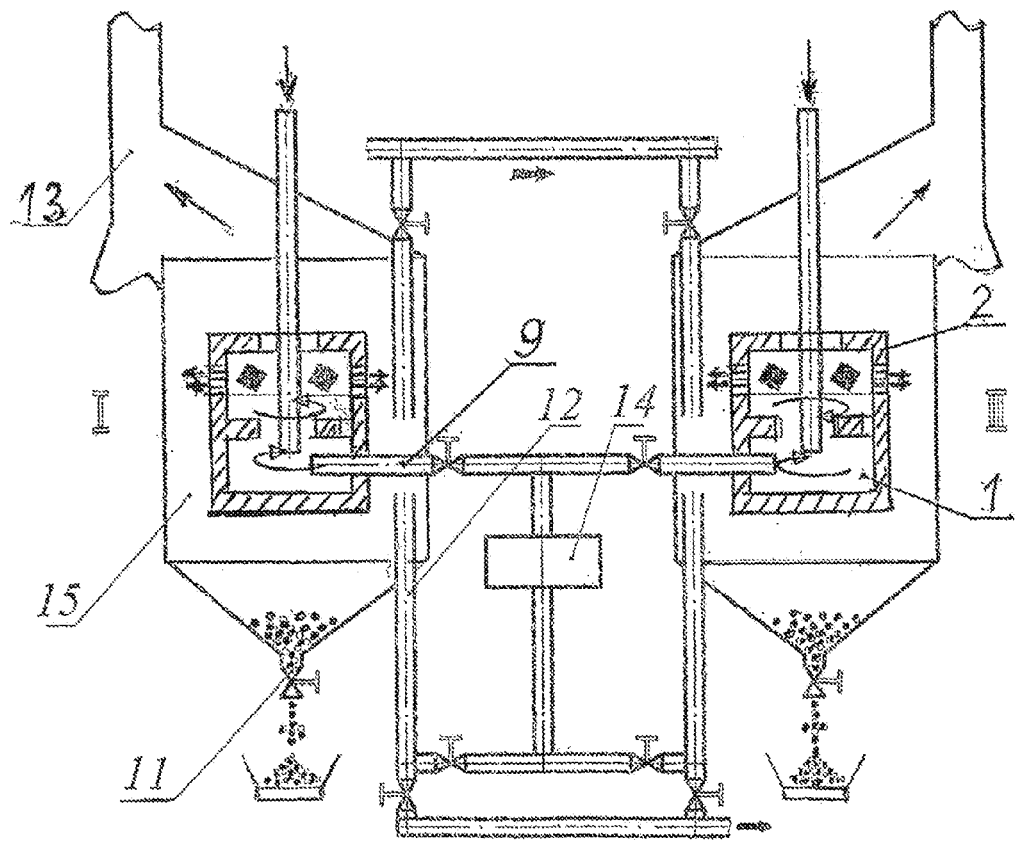
FIG. 4 describes the scheme of water purification comprising two cylindrical mixing chambers.

FIG. 4 demonstrates the device, including two cylindrical mixing chambers which is optimal for industrial application: in one chamber, water is purified, and in the other chamber, the reaction products are fed into.

The speed and time of circulation in the cylindrical mixing chambers are maintained automatically in order to perform processing in a standing wave mode, for example, using software programs and computer control, depending on preset terms of purification and composition of water subject to purification.

The proposed device provides a possibility of consistent unification in one device of several swirl currents organized in different ways. The outlet of spent air occurs in the volume 15 (accumulator-stabilizer) through free water surface. The outlet of undissolved impurities from the volume 15 can be performed by means of automatic water wash.

The volume 15 can be of any shape and size (for instance, with a rectangular cross-section). The proposed device allows to perform deep purification of different waste waters without additional filtering elements, whose role is performed by hydrogels formed in the device. During growth of crystallohydrates, they are inserted into the structure of "nucleating seeds" of impurities, less than 5 angstrom, which are formed in the cylindrical mixing chamber in the process of mass-exchange.

The speed of the swirl current for purification of water impurities with different content of impurities is inversely related to quantity. The advantage of the device is the lack of filtering element that needs to be recovered. In the proposed device, crystallohydrates are output together with assimilated undissolved impurities.

The proposed method is embodied by means of the described device in the following way: purified water is fed by the pump 14 under pressure, providing the needed speed into the supply tangential branch pipes 9, according to the Newton first law, by straight line jets. Running into the curvilinear surface of the cylindrical mixing chamber it is spread according to Navier-Stokes equations in three dimensions, in each point by piece-wise jets.

Visually straight curved jet, which fills the entire volume of the lower mass-exchange chamber 1, creates a free space along the central axis (negative pressure). Through the air supply pipe installed in this space 5, air is input, and reaches the bottom of the lower mass-exchange chamber 1 of the cylindrical mixing chamber. It then spreads over the bottom concentrically to the central axis, up to the edge of the purified water surface.

Then, due to rotational inertia, leading the air from the central to the peripheral part along the channels between the jets of Navier-Stokes motion by that the countermotion, a water-air mixture is created. Water with air moves from the peripheral part to the center (radial drainage), and then passes through the coaxial orifice 4 between the division wall 8 and air supply pipe 5 into the upper mass-exchange chamber 2 of the cylindrical mixing chamber. This creates a smooth curved jet, which consists of liquid and gas phases. In the process of chemical transformations, there is formed the undissolvable solid phase.

The water current becomes three-phased. One part of the current is outlet through the net 7 into the volume 15 with liquid. Through the free surface of the liquid in the volume 15, spent air goes out through branch pipes 13. The undissolved solid phase, coagulating, gravitates to the bottom of the volume 15 and is forced into the hydrodynamic trapping site, placed in the volume 15. (Not shown in FIG. 4). As far as the cylindrical mixing chamber is completely plunged into the liquid in the 15, then through the coaxial orifice 10 from the volume 15, the liquid is directed into the cylindrical mixing chamber into the area of negative pressure and then following the air into the smooth curved jet. This adds an additional mass to the swirl current.

Due to conservation of angular momentum, the speed (linear or rotational) of the swirl current decreases, the negative pressure in the axis area drops and the supply of liquid and air goes down.

The swirl current, while rotating, becomes free from extra mass (disposing it through the net 7) and accelerates, thereby increasing the negative pressure of axial area and providing conditions for recycling. A standing wave is generated.

According to Pascal law, the standing wave is spherical (i.e., it uniformly spreads in all directions) and after reflection from solid stationary walls of the device, it interferes. There are manifested many resonance peaks that destroy large-size formations and provide activation of chemical reactions.

Also, the bypass channels 6 in the dividing wall 8 and coaxial orifices 4 and 10 in the cylindrical mixing chamber promote mixing.

The engineering result of the set forth invention is intensification of processed of purification of natural and waste waters from different impurities without applying of chemical reagents.

INDUSTRIAL APPLICABILITY

The invention can be applied to purification of natural and waste waters in public facilities for purification of waste water for cleaning water from iron, hydroxides of different elements, and can be used for purification and re-use of waste water, and for cleaning drainage water of individual houses.

The invention claimed is:

1. A method of water purification from impurities, the method comprising:
supplying purified water into the cylindrical mixing chamber;
swirling a water current of the purified water;
supplying air through an air supply pipe along an axis of the cylindrical mixing chamber to oxygenate the purified water;
outputting water and undissolvable impurities from the cylindrical mixing chamber;
generating a standing acoustic wave in the cylindrical mixing chamber
wherein the cylindrical mixing chamber is divided into an upper mass-exchange chamber and a lower mass-exchange chamber by a dividing wall that has a coaxial orifice towards the air supply pipe and a peripheral bypass channel for the air supply and water cross-flow,
wherein the water current is swirled in the lower mass-exchange chamber at the preset speed in the peripheral part in order to create a negative pressure along the central axis of the cylindrical mixing chamber, atmosphere air intake and
creating of two countercurrents of water in the lower and upper mass-exchange chambers, the countercurrents interacting with each other to thereby generate the standing wave and simultaneously oxygenate of the water current;
outputting insoluble impurities formed in the water current and accumulated in the peripheral swirl current from the cylindrical mixing chamber through a permeable wall on the side surface of the upper mass-exchange chamber.

2. A water purification device, comprising:
a cylindrical mixing chamber for mixing a current of purified water with air;
an air supply pipe supplying the air to a center of cylindrical mixing chamber;
a container for collecting undissolved impurities;
an output for purified water;
wherein the cylindrical mixing chamber includes a cover plate having the air supply pipe through its center;
the cylindrical mixing chamber being divided into an upper mass-exchange chamber and a lower mass-exchange chamber by at least one dividing wall;
the dividing wall having a coaxial orifice towards the air supply pipe and a peripheral bypass channel;
the lower mass-exchange chamber being formed in a lower part of the cylindrical mixing chamber and having at least two tangential branch pipes for supplying purified water into the cylindrical mixing chamber and for swirling of the water current;
the dividing wall having peripheral bypass channels for bypassing of the undissolved impurities from the upper mass-exchange chamber,
a side surface of the upper mass-exchange chamber having a permeable wall for outputting purified water;
the lower mass-exchange chamber having a branch pipe for outputting of the undissolved impurities and a branch pipe for outputting clean water; and
the upper mass-exchange chamber having a branch pipe outputting air.

3. The water purification device of claim 2, further comprising (a) a pump for supplying the purified water into the cylindrical mixing chamber, (b) a collector for purified water from the cylindrical mixing chamber, (c) a pipeline, and (d) an automatic controller for the pump.

4. The water purification device of claim 2, wherein the permeable wall there is a net.

5. The water purification device of claim 2, wherein the permeable wall is made of orifices having a preset size in a side surface of the upper mass-exchange chamber.

6. The water purification device of claim 2, wherein the cover plate of the cylindrical mixing chamber includes a coaxial orifice towards the air supply pipe.

7. The water purification device of claim 2, further comprising at least two cylindrical mixing chambers.

* * * * *